(12) United States Patent
Stuyck et al.

(10) Patent No.: US 11,640,695 B2
(45) Date of Patent: May 2, 2023

(54) DIGITAL GARMENT GENERATION

(71) Applicant: Meta Platforms Technologies, LLC, Menlo Park, CA (US)

(72) Inventors: Tuur Jan M Stuyck, San Francisco, CA (US); Tony Tung, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/479,399

(22) Filed: Sep. 20, 2021

(65) Prior Publication Data
US 2023/0088866 A1 Mar. 23, 2023

(51) Int. Cl.
| | |
|---|---|
| *G06T 17/20* | (2006.01) |
| *G06T 19/20* | (2011.01) |
| *G06T 7/536* | (2017.01) |
| *G06F 3/01* | (2006.01) |
| *G06V 40/10* | (2022.01) |

(52) U.S. Cl.
CPC ............. *G06T 17/20* (2013.01); *G06F 3/011* (2013.01); *G06T 7/536* (2017.01); *G06T 19/20* (2013.01); *G06V 40/107* (2022.01); *G06T 2210/16* (2013.01)

(58) Field of Classification Search
None
See application file for complete search history.

(56) References Cited

U.S. PATENT DOCUMENTS

| 2011/0166682 A1* | 7/2011 | Brooking | G06F 30/00 700/98 |
|---|---|---|---|
| 2016/0155262 A1* | 6/2016 | Chen | G06T 7/75 345/426 |
| 2020/0151807 A1* | 5/2020 | Zhou | G06Q 30/0643 |

(Continued)

FOREIGN PATENT DOCUMENTS

| WO | 2018052367 A1 | 3/2018 |
|---|---|---|
| WO | 2020113236 A1 | 6/2020 |

OTHER PUBLICATIONS

Jamie Feltham: "Amazon Patents an AR Mirror So You Can Try on Virtual Clothes," VentureBeat, Jan. 7, 2018, 3 Pages, Retrieved from the Internet: URL: https://venturebeat.com/2018/01/07/amazon-patents-an-ar-mirror-so-you-can-try-on-virtual-clothes/.

(Continued)

*Primary Examiner* — Frank S Chen
(74) *Attorney, Agent, or Firm* — Baker Botts L.L.P.

(57) ABSTRACT

In one embodiment, a method includes generating a front panel of a garment based on one or more images including the garment, generating a back panel of the garment, aligning the front panel and the back panel in a three-dimensional space so that the front panel is in front of a three-dimensional body and the back panel is behind the three-dimensional body, identifying one or more pairs of boundary segments of the front panel and the back panel, wherein each pair of boundary segments of the front panel and the back panel are to be attached together, and generating a digital garment by attaching each of the identified one or more pairs of boundary segments of the front panel and the back panel through a plurality of iterative simulations using a physics simulation model.

19 Claims, 9 Drawing Sheets

(56) References Cited

U.S. PATENT DOCUMENTS

2022/0139058 A1* 5/2022 Santesteban ............ G06T 19/20
                                                                   345/419

OTHER PUBLICATIONS

Kyle Wiggers: "Amazon's New AI Technique Lets Users Virtually Try on Outfits," VentureBeat, Jun. 5, 2020, 6 Pages, Retrieved from the Internet: URL: https://venturebeat.com/2020/06/05/amazons-new-ai-technique-lets-users-virtually-try-on-outfits/.

Shen Y., et al., "GAN-Based Garment Generation Using Sewing Pattern Images," European Conference on Computer Vision, 2020, 23 Pages, Retrieved from the Internet: URL: https://gamma.umd.edu/researchdirections/virtualtryon/garmentgeneration/.

Zhu Y., et al., "Generation of Realistic Virtual Garments on Recovery Human Model," Mathematical Problems in Engineering, 2019, vol. 2019, Article ID 5051340, 14 Pages, Retrieved from the Internet: URL: https://doi.org/10.1155/2019/5051340.

International Search Report and Written Opinion for International Application No. PCT/US2022/043712, dated Jan. 10, 2023, 8 pages.

* cited by examiner

DIGITAL GARMENT GENERATION

TECHNICAL FIELD

This disclosure generally relates to artificial-reality systems, and in particular, related to generating a digital garment.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for generating a digital garment based on one or more images of a garment in an automated and template free manner. The generation of digital garments has become increasingly popular with growing needs for garment models in various applications such as virtual try-on. Traditional ways of generating digital garments are very labor intensive. Also, the generation of digital garments in those traditional ways may require artistic skills and frequent manual interventions by trained professionals. When a large number of digital garments with various types and sizes are needed for one or more applications, generating the digital garments may be a bottleneck. The invention disclosed in this application may utilize a garment segmentation model, a real-time simulation engine and a real-time body tracking solution to generate a digital garments in an automated manner.

Once a digital garment is generated, the digital garment may be used for applications, such as a virtual try-on. With the virtual try-on application, a user may be able to try-on a virtual garment on an estimated body shape and a pose to obtain a sense of style and a sizing recommendation that is customized to the user's body properties. Though the virtual try-on application may provide compelling and engaging experience to the user, the virtually simulated garment may not be tightly coupled with the real world. Systems and methods for simulating a digital garment in real-time such that the digital garment may be interacted with natural hand motions of the user.

A computing device may generate a front panel of a garment based on one or more images comprising the garment. To generate the front panel of the garment, the computing device may access the one or more images comprising a front of the garment. The computing device may generate a front-segmentation mask identifying the front of the garment in the one or more accessed images. The front-segmentation mask may be two-dimensional. The computing device may generate the front panel corresponding to the generated front-segmentation mask. The front panel may comprise three-dimensional flat meshes. The computing device may generate a back panel of the garment. In particular embodiments, the back panel may be a duplicate of the front panel. In particular embodiments, the computing device may access one or more second images comprising a back of the garment to generate the back panel of the garment. The computing device may generate a back-segmentation mask identifying the back of the garment in the one or more second images. The computing device may generate the back panel corresponding to the generated back-segmentation mask. The back panel may comprise three-dimensional flat meshes. The computing device may align the front panel and the back panel in a three-dimensional space so that the front panel is in front of a three-dimensional body and the back panel is behind the three-dimensional body. In particular embodiments, the three-dimensional body may be a three-dimensional template of a human body. In particular embodiments, the three-dimensional body may be generated based on a three-dimensional scan or a depth map of a user wearing the garment. The computing device may identify one or more pairs of boundary segments of the front panel and the back panel. Each pair of boundary segments of the front panel and the back panel may be to be attached together. To identify the one or more pairs of boundary segments of the front panel and the back panel, the computing device may draw virtual lines that perpendicularly intersect with boundaries of the front panel and the back panel. The computing device may identify each continuous portion of the boundaries whose corresponding virtual lines do not intersect with the three-dimensional body. The computing device may generate a digital garment by attaching each of the identified one or more pairs of boundary segments of the front panel and the back panel through a plurality of iterative simulations using a physics simulation model. In each iteration of the plurality of iterative simulations, the computing device may decrease a distance between each pair of boundary segments of the front panel and the back panel. The computing device may deform the garment based on the distance between each pair of boundary segments of the front panel and the back panel and a shape of the three-dimensional body. The computing device may determine that the three-dimensional body moves from the first pose to a second pose. The computing device may deform the digital garment according to the second pose of the three-dimensional body.

The generated digital garment may be used for a virtual try-on, where a user may drape the digital garment to an avatar representing the user. The computing device may detect the user's action to a piece of the digital garment using real-time hand tracking techniques. The user's action may comprise touching, pinching, holding, or any suitable user action. The computing device may deform the digital garment to meet additional constraints caused by the user's action by providing information associated with the detection to a physics simulation model. In particular embodiments, the computing device may detect the user's action to the piece of the digital garment by observing collisions between meshes corresponding to the avatar and meshes corresponding to the digital garment. In particular embodiments, to detect the user's action to the piece of the digital garment, the computing device may detect that a distance between fingers of the avatar and the digital garment is less than a threshold. The computing device may generate a three-dimensional volume force field around the fingers. An amount of force at a point within the force field may depend on a distance from the fingers. Any portion of the digital garment within the force field may be influenced by the force. In particular embodiments, to detect the user's action to the piece of the digital garment, the computing device may generate a point cloud of a garment that the user is wearing using depth sensing techniques. The computing device may provide the point cloud to a physics simulation model that keeps the digital garment to be consistent with the point cloud.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
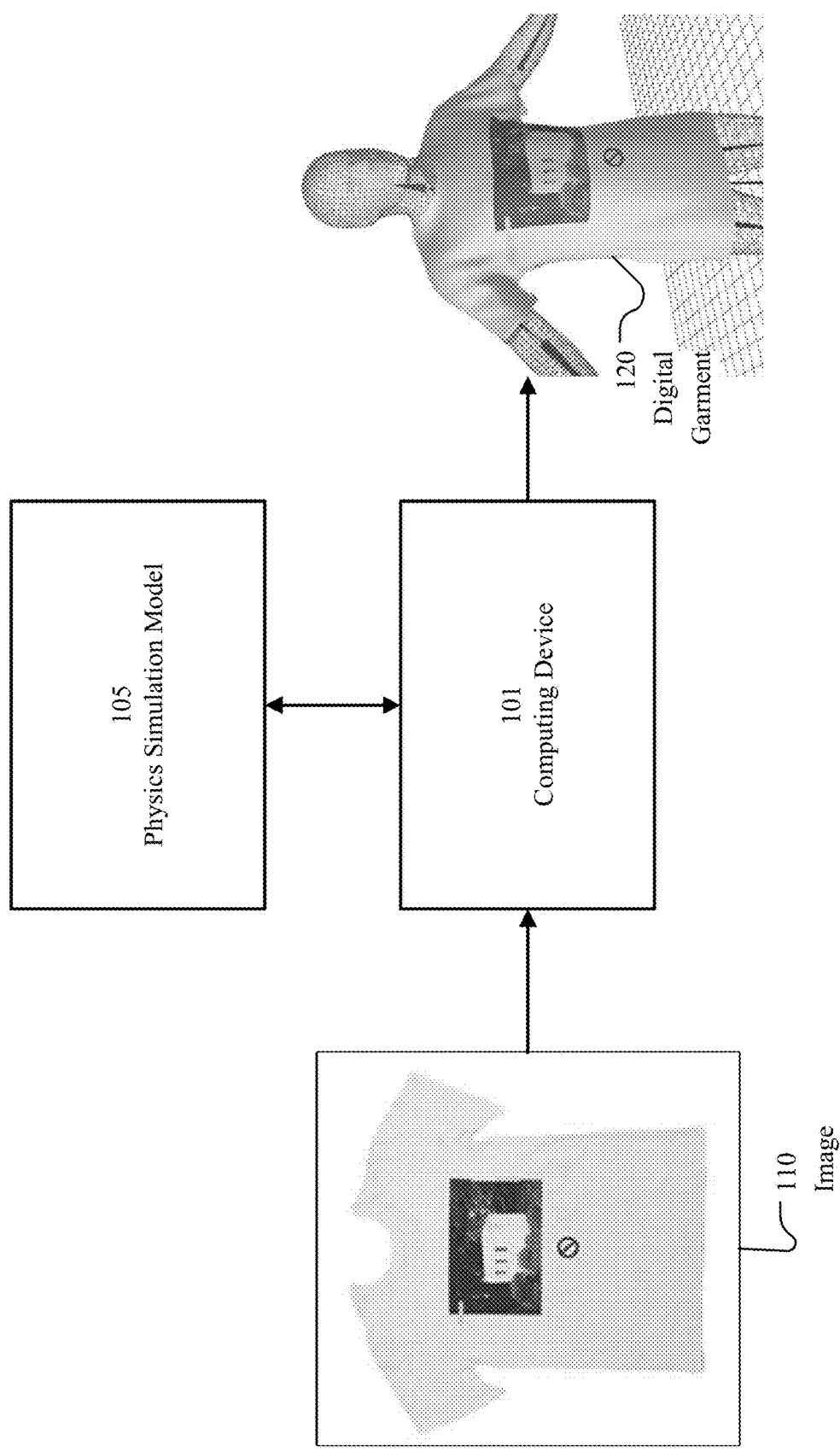
FIG. 1 illustrates an example architecture for generating a digital garment.

FIG. 1 illustrates an example architecture for generating a digital garment. A computing device 101 may access one or more images 110 of a garment. The computing device 101 may process the one or more accessed images 110 to generate a three-dimensional digital garment 120. The computing device 101 may utilize a physics simulation model 105 for generating the digital garment 120. Although this disclosure describes a particular architecture for generating a three-dimensional digital garment based on one or more images of a garment, this disclosure contemplates any suitable architecture for generating a three-dimensional digital garment based on one or more images of a garment.

Figure 2:
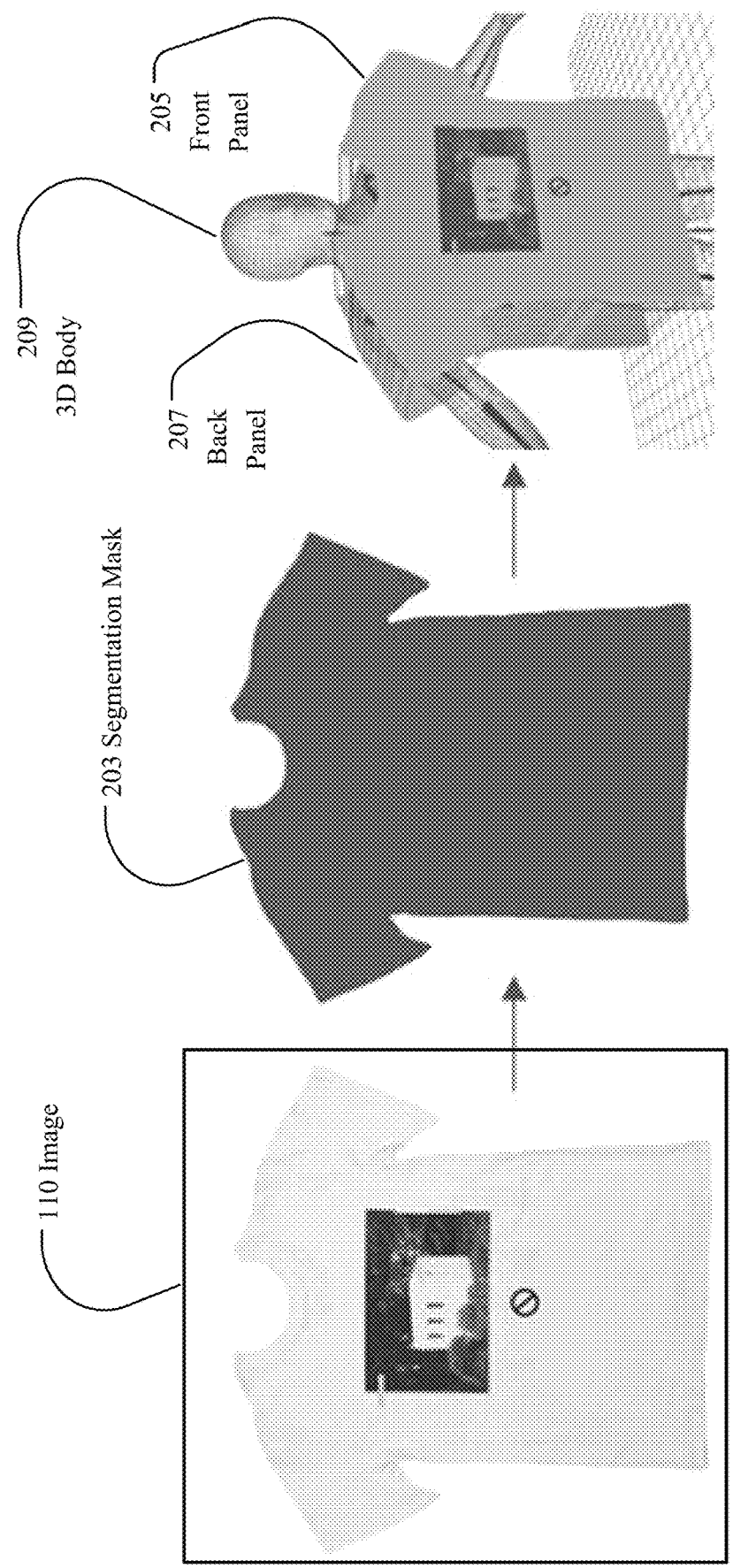
FIG. 2 illustrates an example process for generating a digital garment based on one or more images.

In particular embodiments, the computing device 101 may generate a front panel of a garment based on one or more images 110 comprising the garment. To generate the front panel of the garment, the computing device 101 may access the one or more images 110 comprising a front of the garment. The computing device 101 may generate a front-segmentation mask identifying the front of the garment in the one or more accessed images. The front-segmentation mask may be two-dimensional. The computing device 101 may generate the front panel corresponding to the generated front-segmentation mask. The front panel may comprise three-dimensional flat meshes. FIG. 2 illustrates an example process for generating a digital garment based on one or more images. As an example and not by way of limitation, illustrated in FIG. 2, a computing device 101 may access one or more images 110 of a garment. The computing device 101 may generate a front-segmentation mask 203 identifying a front of the garment in the one or more RGB images 110. Then the computing device 101 may generate a front panel 205 of the garment corresponding to the front-segmentation mask 203. The front panel 205 may comprise three-dimensional meshes. Although this disclosure describes generating a front panel of a garment based on one or more images in a particular manner, this disclosure contemplates generating a front panel of a garment based on one or more images in any suitable manner.

In particular embodiments, the computing device 101 may generate a back panel of the garment. In particular embodiments, the back panel may be a duplicate of the front panel. In particular embodiments, the computing device 101 may access one or more second images comprising a back of the garment to generate the back panel of the garment. The computing device 101 may generate a back-segmentation mask identifying the back of the garment in the one or more second images. The computing device 101 may generate the back panel corresponding to the generated back-segmentation mask. The back panel may comprise three-dimensional flat meshes. As an example and not by way of limitation, illustrated in FIG. 2, the one or more images 110 may comprise only the front of the garment. In such a case, the computing device 101 may generate a back panel 207 by duplicating the front panel 205. As another example and not by way of limitation, the computing device 101 may access one or more second images comprising a back of the garment. The computing device 101 may generate a back-segmentation mask identifying the back of the garment in the one or more second images. The computing device 101 may generate a back panel 207 corresponding to the back-segmentation mask. Although this disclosure describes generating a back panel of the garment in a particular manner, this disclosure contemplates generating a back panel of the garment in any suitable manner.

In particular embodiments, the computing device 101 may align the front panel 205 and the back panel 207 in a three-dimensional space so that the front panel is in front of a three-dimensional body 209 and the back panel 207 is behind the three-dimensional body 209. In particular embodiments, the three-dimensional body 209 may be a three-dimensional template of a human body. In particular embodiments, the one or more images 110 may comprise a user wearing the garment. Then, the three-dimensional body 209 may be generated based on a three-dimensional scan or a depth map of the user wearing the garment. Although this disclosure describes aligning the front panel and the back panel in the three-dimensional space in a particular manner, this disclosure contemplates aligning the front panel and the back panel in the three-dimensional space in any suitable manner.

Figure 3:
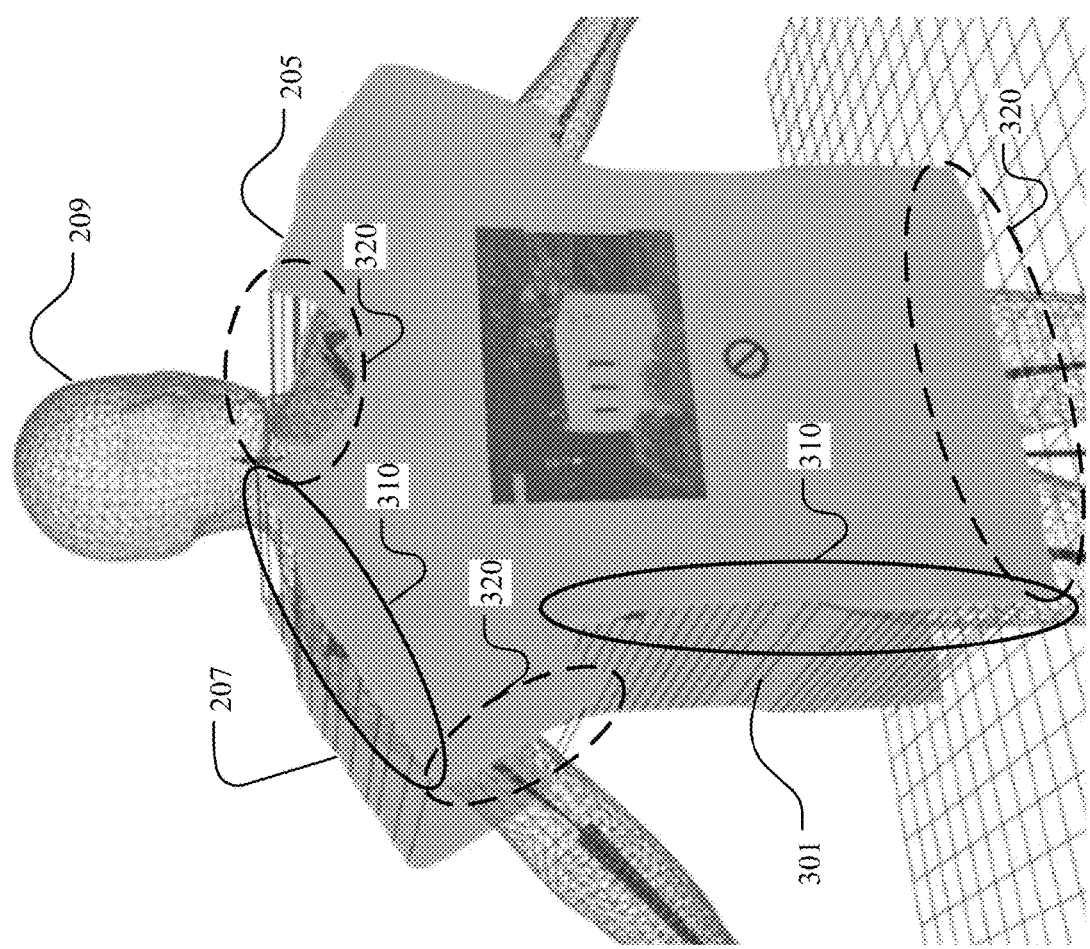
FIG. 3 illustrates an example scenario of identifying one or more pairs of boundary segments of the front panel and back panel.

In particular embodiments, the computing device 101 may identify one or more pairs of boundary segments of the front panel 205 and the back panel 207. To identify the one or more pairs of boundary segments of the front panel and the back panel, the computing device 101 may draw virtual lines that perpendicularly intersect with boundaries of the front panel 205 and the back panel 207. The computing device 101 may identify each continuous portion of the boundaries whose corresponding virtual lines do not intersect with the three-dimensional body 209. FIG. 3 illustrates an example scenario of identifying one or more pairs of boundary segments of the front panel and back panel. As an example and not by way of limitation, illustrated in FIG. 3, the computing device 101 may draw virtual lines 301 that perpendicularly intersect with boundaries of the front panel 205 and the back panel 207. The computing device 101 may determine a continuous portion of the boundaries as a boundary segment 310 if the virtual lines 301 corresponding to the portion do not intersect with the three-dimensional body 209. The boundary segments 310 are depicted with solid ellipses in FIG. 3. The computing device 101 may determine a continuous portion of the boundaries as a non-boundary segment 320 if more than a pre-determined percentage of the virtual lines 301 corresponding to the portion intersect with the three-dimensional body 209. Those segments 320 may comprise arm sleeve, neck, or bottom of the garment, which are depicted with dotted ellipses in FIG. 3. Although this disclosure describes identifying one or more pairs of boundary segments of the front panel and back panel in a particular manner, this disclosure contemplates identifying one or more pairs of boundary segments of the front panel and back panel in any suitable manner.

Figure 4B:
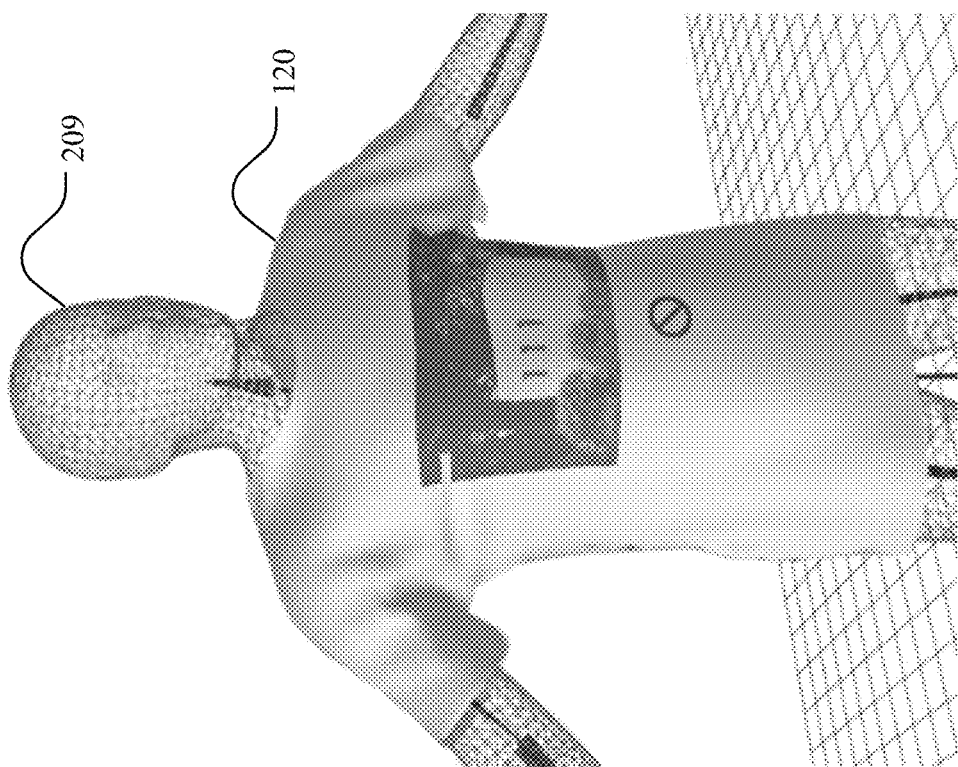
FIG. 4B illustrates an example result of a final iteration of the plurality of simulation iterations for generating a digital garment.
Figure 4A:
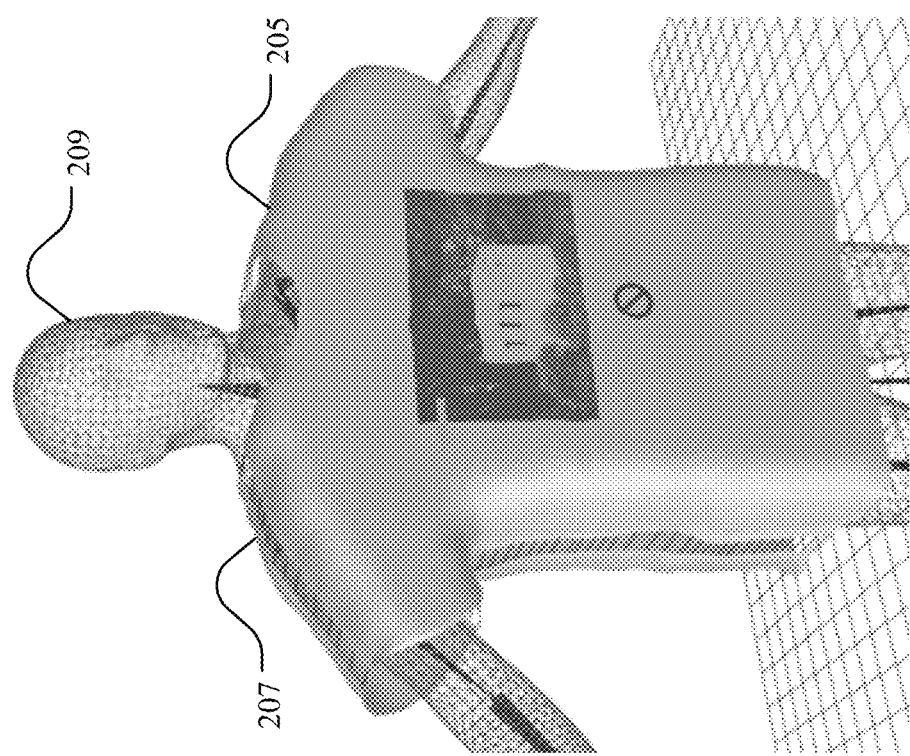
FIG. 4A illustrates an example intermediate iteration among the plurality of simulation iterations for generating a digital garment.

In particular embodiments, the computing device 101 may generate a digital garment 120 by attaching each of the identified one or more pairs of boundary segments 310 of the front panel 205 and the back panel 207 through a plurality of iterative simulations using a physics simulation model 105. In each iteration of the plurality of iterative simulations, the computing device 101 may decrease a distance between each pair of boundary segments 310 of the front panel 205 and the back panel 207. The computing device 101 may deform the garment based on the distance between each pair of boundary segments 310 of the front panel and the back panel and a shape of the three-dimensional body 209. FIG. 4A illustrates an example intermediate iteration among the plurality of simulation iterations for generating a digital garment. As an example and not by way of limitation, illustrated in FIG. 4A, the computing device 101 decreases the distance between each pair of boundary segments 310 of the front panel 205 and the pack panel 207 at each iteration. The computing device 101 also deforms the front panel 205 and the back panel 207 of the garment based on the distance between the boundary segments 310 and the shape of the three-dimensional body 209 using a physics simulation model 105. FIG. 4B illustrates an example result of a final iteration of the plurality of simulation iterations for generating a digital garment. As an example and not by way of limitation, illustrated in FIG. 4B, each pair of boundary segments 310 has been attached together. The garment has been deformed to fit to the three-dimensional body 209. The generated digital garment 120 may be represented by three-dimensional meshes. In particular embodiments, the generated digital garment 120 may be represented by three-dimensional point clouds. Although this disclosure describes generating a digital garment through a plurality of iterative simulations using a physics simulation model in a particular manner, this disclosure contemplates generating a digital garment through a plurality of iterative simulations using a physics simulation model in any suitable manner.

In particular embodiments, the computing device 101 may determine that the three-dimensional body 209 moves from the first pose to a second pose. The computing device 101 may deform the digital garment 120 according to the second pose of the three-dimensional body 209. Although this disclosure describes deforming the digital garment based on a detected change in pose of the three-dimensional body in a particular manner, this disclosure contemplates deforming the digital garment based on a detected change in pose of the three-dimensional body in any suitable manner.

Figure 5:
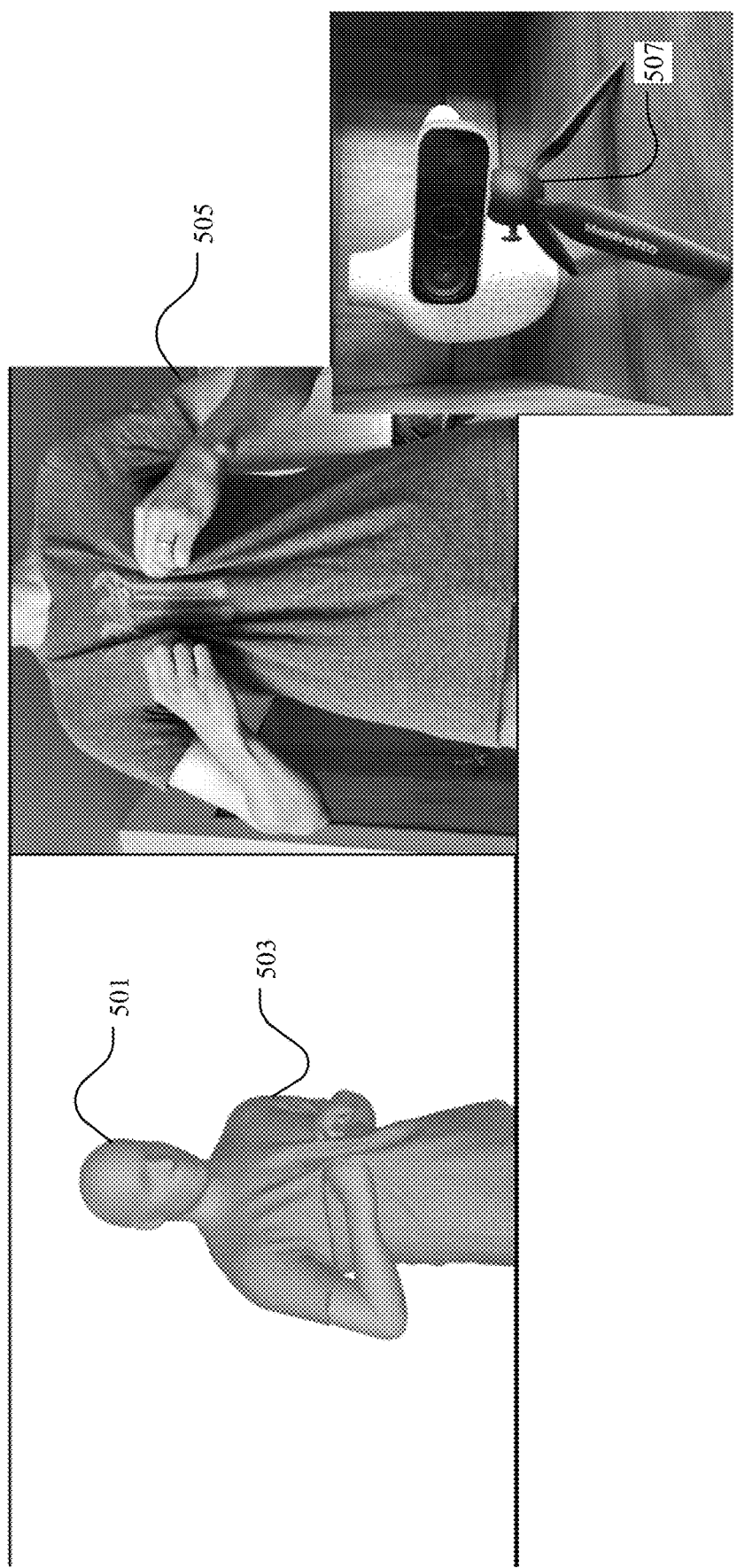
FIG. 5 illustrates an example virtual try-on system.

In particular embodiments, the generated digital garment 120 may be used for an application such as a virtual try-on, where a user may drape the digital garment 120 to an avatar representing the user. The computing device 101 may detect the user's action to a piece of the digital garment 120 using real-time hand tracking techniques. The user's action may comprise touching, pinching, holding, or any suitable user action. The computing device 101 may deform the digital garment 120 to meet additional constraints caused by the user's action by providing information associated with the detection to a physics simulation model. FIG. 5 illustrates an example virtual try-on system. As an example and not by way of limitation, illustrated in FIG. 5, an avatar 501 representing a user is wearing a digital garment 503. The avatar 501 may have the user-selected body properties. A tracking system 507 may track movements of the user 505 using one or more cameras, one or more depth sensors, or any suitable component for the tracking system, particularly movements of the hands of the user 505. The avatar 501 imitates the actions of the user 505 detected by the tracking system 507. The computing device 101 may use a physics simulation model to deform the digital garment 503 to meet additional constraints caused by the avatar's movements. Although this disclosure describes a particular application where the digital garment is deformed to meet constraints caused by the user's action, this disclosure contemplates any suitable application where the digital garment is deformed to meet constraints caused by the user's action.

In particular embodiments, the computing device 101 may detect the user's action to the piece of the digital garment by observing collisions between meshes corresponding to the avatar 501 and meshes corresponding to the digital garment 503. The computing device 101 may provide information associated with the observed collisions to a physics simulation model to deform the digital garment 503 accordingly. Although this disclosure describes detecting the user's action to the piece of the digital garment by observing collisions between meshes corresponding to the avatar and meshes corresponding to the digital garment in a particular manner, this disclosure contemplates detecting the user's action to the piece of the digital garment by observing collisions between meshes corresponding to the avatar and meshes corresponding to the digital garment in any suitable manner.

Figure 6:
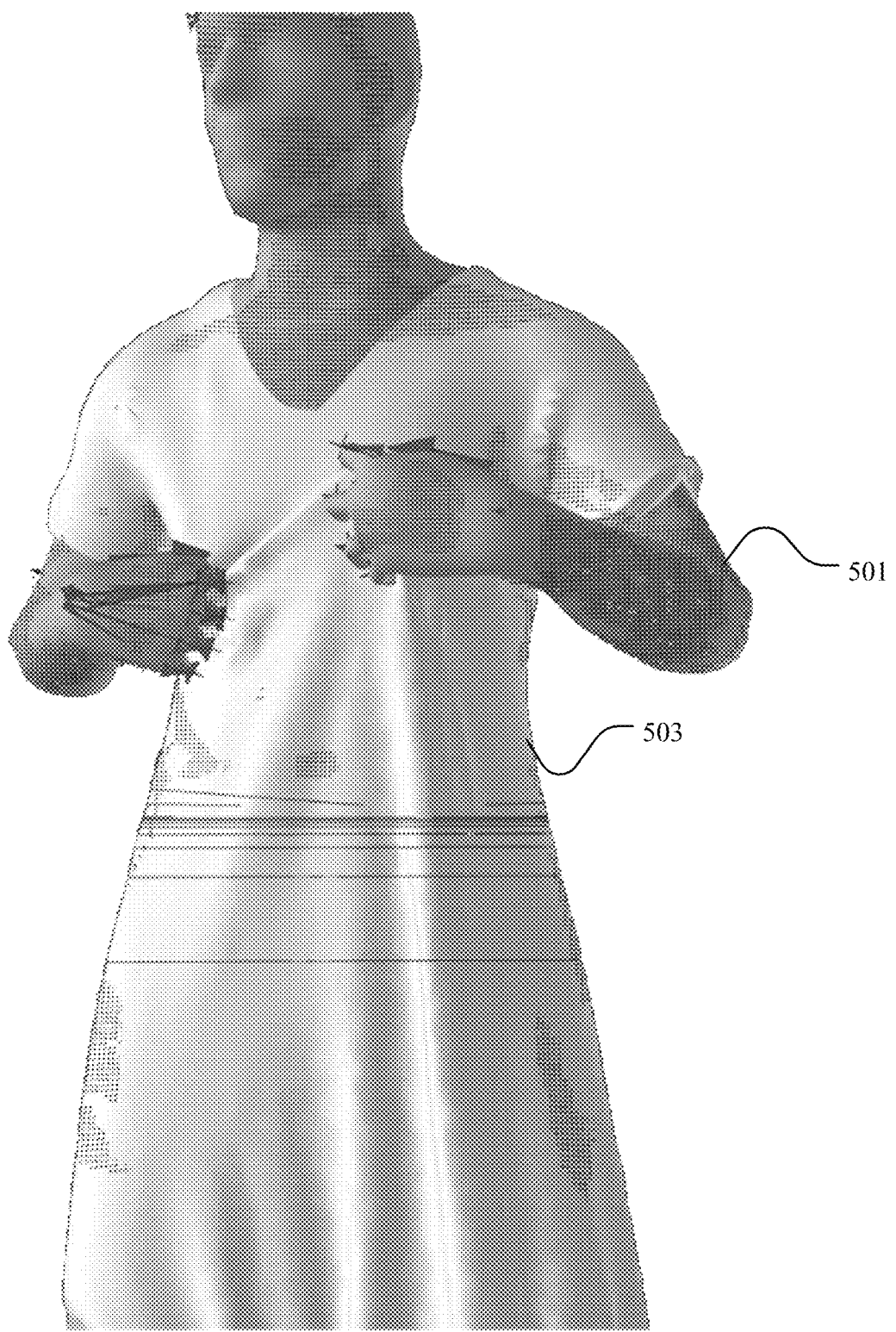
FIG. 6 illustrates an example deformation of a digital garment based on three-dimensional volume force fields around fingers.

In particular embodiments, to detect the user's action to the piece of the digital garment 503, the computing device 101 may detect that a distance between finger of the avatar 501 and the digital garment 503 is less than a threshold. The computing device 101 may generate a three-dimensional volume force field around the fingers. An amount of force at a point within the force field may depend on a distance from the fingers. Any portion of the digital garment 503 within the force field may be influenced by the force. FIG. 6 illustrates an example deformation of a digital garment based on three-dimensional volume force fields around fingers. As an example and not by way of limitation, illustrated in FIG. 6, a digital garment 503 is draped on an avatar 501 representing a user 505. The avatar 501 imitates the movements of the user 505 that are tracked by the tracking system 507. The computing device 101 may detect that a distance between a finger of the avatar 501 and the digital garment 503 is within a threshold. The computing device 101 may generate a three-dimensional force field around the finger, where a direction of the force may be determined based on a position of the finger in relation with the digital garment 503. The computing device 101 may provide information associated with the generated three-dimensional force field to a physics simulation model so that the physics simulation model can deform the digital garment 503 based on the generated three-dimensional force field. Although this disclosure describes deforming the digital garment based on a generated three-dimensional force field around fingers in a particular manner, this disclosure contemplates deforming the digital garment based on a generated three-dimensional force field around fingers in any suitable manner.

Figure 7:
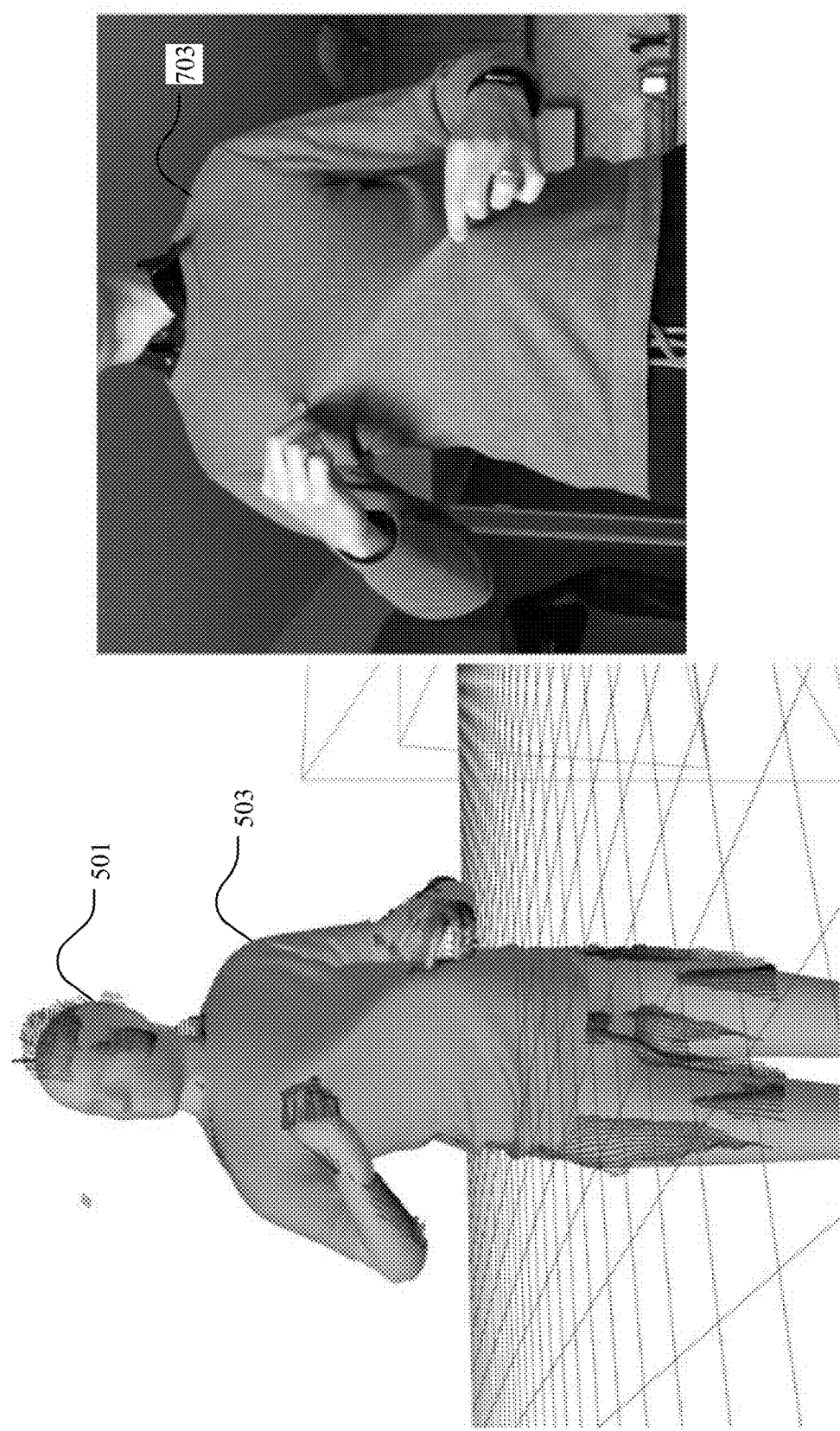
FIG. 7 illustrates an example deformation of a digital garment based on a point cloud of a garment the user is wearing.

In particular embodiments, to detect the user's action to the piece of the digital garment 503, the computing device 101 may generate a point cloud of a garment the user 505 is wearing using depth sensing techniques. The computing device 101 may provide the point cloud to a physics simulation model that keeps the digital garment 503 to be consistent with the point cloud. FIG. 7 illustrates an example deformation of a digital garment based on a point cloud of a garment the user is wearing. As an example and not by way of limitation, illustrated in FIG. 7, the computing device 101 may generate a point cloud of the garment 703 that the user 505 is wearing based on depth data associated with the garment 703 acquired by the tracking system 507. In particular embodiments, the depth data may be acquired based on a plurality of cameras. In particular embodiments, the depth data may be acquired using one or more depth sensors. The computing device 101 may provide the point cloud of the garment 703 to a physics simulation model so that the physics simulation model can deform the digital garment 503 draped on the avatar 601 representing the user 505. The physics simulation model may deform the digital garment 503 in a way such that a point cloud of the digital garment 503 is consistent with the point cloud of the garment 703. Although this disclosure describes deforming the digital garment based on a point cloud of the garment the user is wearing in a particular manner, this disclosure contemplates deforming the digital garment based on a point cloud of the garment the user is wearing in any suitable manner.

Figure 8:
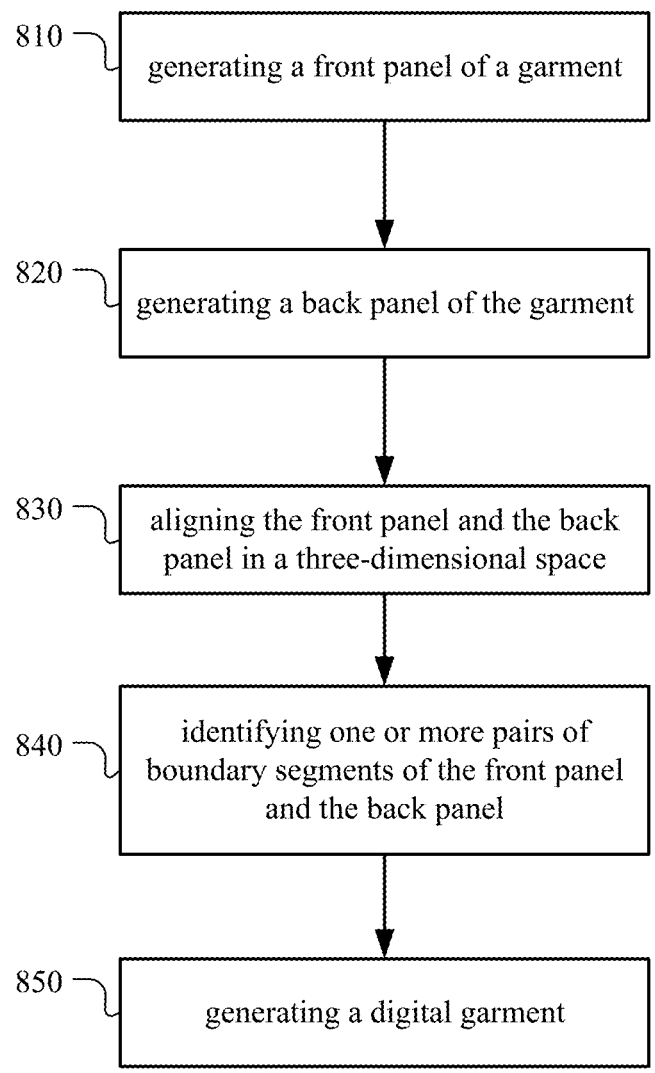
FIG. 8 illustrates an example method for generating a digital garment based on one or more images comprising a garment.

FIG. 8 illustrates an example method 800 for generating a digital garment based on one or more images comprising a garment. The method may begin at step 810, where the computing device 101 may generate a front panel of a garment based on one or more images comprising the garment. At step 820, the computing device 101 may generating a back panel of the garment. At step 830, the computing device 101 may align the front panel and the back panel in a three-dimensional space so that the front panel is in front of a three-dimensional body and the back panel is behind the three-dimensional body. At step 840, the computing device 101 may identify one or more pairs of boundary segments of the front panel and the back panel. Each pair of boundary segments of the front panel and the back panel may be to be attached together. At step 850, the computing device 101 may generate a digital garment by attaching each of the identified one or more pairs of boundary segments of the front panel and the back panel through a plurality of iterative simulations using a physics simulation model. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating a digital garment based on one or more images comprising a garment including the particular steps of the method of FIG. 8, this disclosure contemplates any suitable method for generating a digital garment based on one or more images comprising a garment including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Systems and Methods

Figure 9:
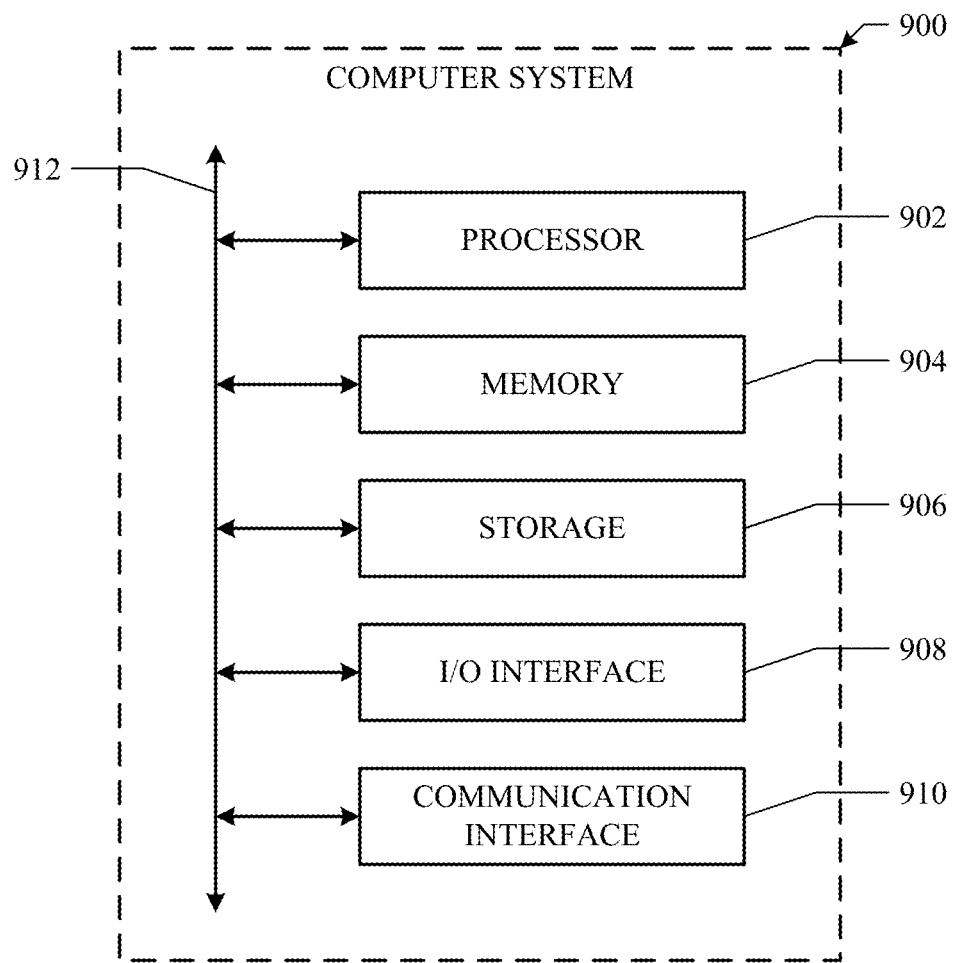
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   generating a front panel of a garment based on one or more images comprising the garment;
   generating a back panel of the garment;
   aligning the front panel and the back panel in a three-dimensional space so that the front panel is in front of a three-dimensional body and the back panel is behind the three-dimensional body;
   identifying one or more pairs of boundary segments of the front panel and the back panel, wherein each pair of boundary segments of the front panel and the back panel are to be attached together;
   generating a digital garment by attaching each of the identified one or more pairs of boundary segments of the front panel and the back panel through a plurality of iterative simulations using a physics simulation model;
   detecting a user's action to a piece of the digital garment using real-time hand tracking techniques; and
   deforming the digital garment to meet additional constraints caused by the user's action by providing information associated with the detection to a physics simulation model.

2. The method of claim 1, wherein generating the front panel comprising:
   accessing the one or more images comprising a front of the garment;

generating a front-segmentation mask identifying the front of the garment in the one or more accessed images; and generating the front panel corresponding to the generated front-segmentation mask.

3. The method of claim 2, wherein the front-segmentation mask is two-dimensional.

4. The method of claim 1, wherein the back panel is a duplicate of the front panel.

5. The method of claim 1, wherein the back panel is generated by:

accessing one or more second images comprising a back of the garment;

generating a back-segmentation mask identifying the back of the garment in the one or more second images; and generating the back panel corresponding to the generated back-segmentation mask.

6. The method of claim 1, wherein the front panel and the back panel comprise three-dimensional flat meshes.

7. The method of claim 1, wherein the three-dimensional body is a three-dimensional template of a human body.

8. The method of claim 1, wherein the three-dimensional body is generated based on a three-dimensional scan or a depth map of a user wearing the garment.

9. The method of claim 1, wherein identifying the one or more pairs of boundary segments of the front panel and the back panel comprises:

drawing virtual lines that perpendicularly intersect with boundaries of the front panel and the back panel; and identifying each continuous portion of the boundaries whose corresponding virtual lines do not intersect with the three-dimensional body.

10. The method of claim 1, wherein each iteration of the plurality of iterative simulations comprises:

decreasing a distance between each pair of boundary segments of the front panel and the back panel; and deforming the garment based on the distance between each pair of boundary segments of the front panel and the back panel and a shape of the three-dimensional body.

11. The method of claim 1, further comprising:

determining that the three-dimensional body moves from the first pose to a second pose; and deforming the digital garment according to the second pose of the three-dimensional body.

12. The method of claim 1, wherein the generated digital garment is used for a virtual try-on, in which a user drapes the digital garment to an avatar representing the user.

13. The method of claim 12, wherein detecting the user's action to the piece of the digital garment comprises observing collisions between meshes corresponding to the avatar and meshes corresponding to the digital garment.

14. The method of claim 12, wherein detecting the user's action to the piece of the digital garment comprises:

detecting that a distance between fingers of the avatar and the digital garment is less than a threshold; and generating a three-dimensional volume force field around the fingers, in which an amount of force at a point within the force field depends on a distance from the fingers, wherein any portion of the digital garment within the force field is influenced by the force.

15. The method of claim 12, wherein detecting the user's action to the piece of the digital garment comprises:

generating a point cloud of a garment the user is wearing using depth sensing techniques; and providing the point cloud to a physics simulation model that keeps the digital garment to be consistent with the point cloud.

16. The method of claim 12, wherein the user's action comprises touching, pinching, or holding.

17. One or more computer-readable non-transitory storage media embodying software that is operable when executed to:

generate a front panel of a garment based on one or more images comprising the garment;

generate a back panel of the garment;

align the front panel and the back panel in a three-dimensional space so that the front panel is in front of a three-dimensional body and the back panel is behind the three-dimensional body;

identify one or more pairs of boundary segments of the front panel and the back panel, wherein each pair of boundary segments of the front panel and the back panel are to be attached together;

generate a digital garment by attaching each of the identified one or more pairs of boundary segments of the front panel and the back panel through a plurality of iterative simulations using a physics simulation model;

detect a user's action to a piece of the digital garment using real-time hand tracking techniques; and deform the digital garment to meet additional constraints caused by the user's action by providing information associated with the detection to a physics simulation model.

18. The media of claim 17, wherein generating the front panel comprising:

accessing the one or more images comprising a front of the garment;

generating a front-segmentation mask identifying the front of the garment in the one or more accessed images; and generating the front panel corresponding to the generated front-segmentation mask.

19. A system comprising:

one or more processors; and a non-transitory memory coupled to the processors comprising instructions executable by the processors, the processors operable when executing the instructions to:

generate a front panel of a garment based on one or more images comprising the garment;

generate a back panel of the garment;

align the front panel and the back panel in a three-dimensional space so that the front panel is in front of a three-dimensional body and the back panel is behind the three-dimensional body;

identify one or more pairs of boundary segments of the front panel and the back panel, wherein each pair of boundary segments of the front panel and the back panel are to be attached together;

generate a digital garment by attaching each of the identified one or more pairs of boundary segments of the front panel and the back panel through a plurality of iterative simulations using a physics simulation model;

detect a user's action to a piece of the digital garment using real-time hand tracking techniques; and deform the digital garment to meet additional constraints caused by the user's action by providing information associated with the detection to a physics simulation model.

* * * * *